March 6, 1956    H. C. RHODES    2,737,130
APPARATUS FOR REDUCING GAS POCKETS IN DOUGH
Filed April 27, 1954    2 Sheets-Sheet 1

INVENTOR.
HERBERT C. RHODES
BY *[signature]*
ATTORNEY

March 6, 1956   H. C. RHODES   2,737,130
APPARATUS FOR REDUCING GAS POCKETS IN DOUGH
Filed April 27, 1954   2 Sheets-Sheet 2

INVENTOR.
HERBERT C. RHODES
BY
ATTORNEY

United States Patent Office 2,737,130
Patented Mar. 6, 1956

2,737,130
APPARATUS FOR REDUCING GAS POCKETS IN DOUGH

Herbert C. Rhodes, Portland, Oreg.

Application April 27, 1954, Serial No. 425,789

1 Claim. (Cl. 107—12)

This invention relates to the treating or sheeting of pieces of dough preparatory to the forming of the same into desired shapes for deposit in the baking pans.

In the handling and molding of dough with modern bakery machines each individual dough piece is customarily pressed out by rolls into a flat shape or "sheet" of substantially uniform predetermined thickness, whereupon the "sheet" is rolled up or formed into the desired loaf or other shape for baking.

One of the problems connected with the preparation of dough loaves and the like for baking is the accumulation of excessive gas pockets or air bubbles in the dough. This is a serious and customary problem when the dough pieces are first flattened or "sheeted" and then rolled into loaf shapes, for the collection of gas pockets or air bubbles in the dough sheet may result in substantial and undesirable voids or air spaces in the finished baked product.

The main object of the present invention is to reduce the amount of such gas pockets or air bubbles in the dough before the dough is placed in the baking pans, and, more specifically, to eliminate any large or excessive gas pockets or air bubbles in the dough sheets prior to the forming of the sheets into proper shape for deposit in the pans preparatory to baking.

I have found that the "sheeting" of dough pieces, which is done by passing the dough pieces between compressing rolls, has a tendency to cause air bubbles or gas pockets to remain at the ends of the sheets, or else to be caused to migrate to one end as a result of the pressing action of the rolls on the dough. In such "sheeting" of dough pieces, the pressing rolls are set a predetermined fixed distance apart in order to compress the dough into sheets of substantially uniform thickness. However, I have observed that when dough pieces are rolled out or pressed into "sheets" the tip ends of the sheets will invariably be of somewhat less thickness than the main portion of the sheet. Consequently, when the sheeting rolls are set the fixed predetermined distance apart, corresponding to the desired thickness to be given the dough sheets, the tip ends of the dough sheets, due to the fact that they will be of slightly less thickness than the rest of the pressed out sheets, will escape the compressing action of the rolls. It is this fact which I believe is the cause of excessive air bubbles or gas pockets remaining or appearing largely at the ends of the dough sheets.

A more specific object of this invention is to eliminate or reduce such air bubbles or gas pockets accordingly by subjecting the thinner tip ends of the dough sheets to sufficient pressure to burst the excessive air bubbles at such places without reducing the desired thickness of the body of the dough sheet.

The manner in which, and the means by which, I accomplish these objects will be explained briefly with reference to the accompanying drawings.

In the drawings, all of which are more or less diagrammatic:

Figure 3:
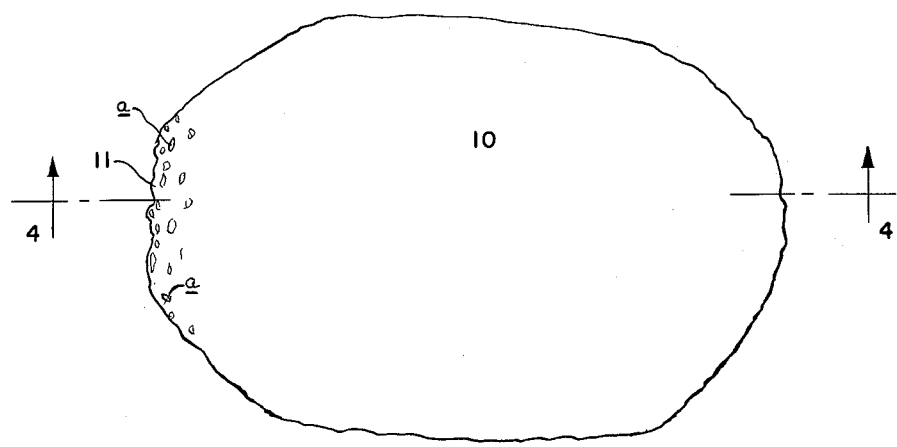
Figure 3 is a plan view of an ordinary dough sheet which is assumed to have been passed between a pair of pressing rolls mounted in the heretofore customary manner with their axes fixed.
Figure 4:
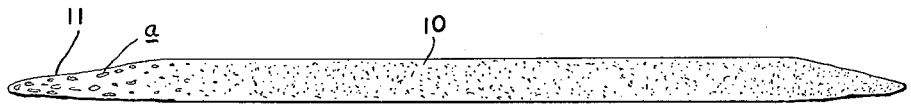
Figure 4 is a section through the same dough sheet, corresponding to line 4—4 of Figure 3, and indicating, in a somewhat exaggerated manner, the presence of air bubbles or gas pockets in the sheeted dough.

Referring first to Figures 3 and 4, the dough sheet 10 is assumed to have been rolled out or sheeted, in the customary manner, by being passed through a pair of rolls having their axes set at a fixed distance apart so that the spacing between the adjacent roll surfaces would be equal approximately to the desired thickness for the dough sheet 10. However, as previously mentioned, I have observed that the passing of the piece of dough between a pair of such rolls and the resulting compressing and flattening, or "sheeting," of the dough will result in the ends of the dough sheet, particularly the end which passes between the rolls first (thus the end 11 of the dough sheet of Figures 3 and 4) being slightly tapered in thickness so that at the extreme tip of the end the thickness of the dough sheet will be less than the spacing between the compressing rolls. Consequently, any air bubbles in the end 11, or any air bubbles which may be caused to move to the end of the sheet under the action of the rolls, may avoid being subjected to any bursting compression due to the reduced thickness of the dough sheet at such end. Such surviving air bubbles or gas pockets are indicated diagrammatically by the letter $a$ in Figures 3 and 4. With my invention, however, these air bubbles at the tip ends of the dough sheets are dissipated or burst by subjecting the tip ends of the sheets, regardless of the thickness of the dough at the tip ends, to special compressing pressure for the express purpose of removing those air bubbles which otherwise would be allowed to remain in the dough at the tip.

Figure 1:
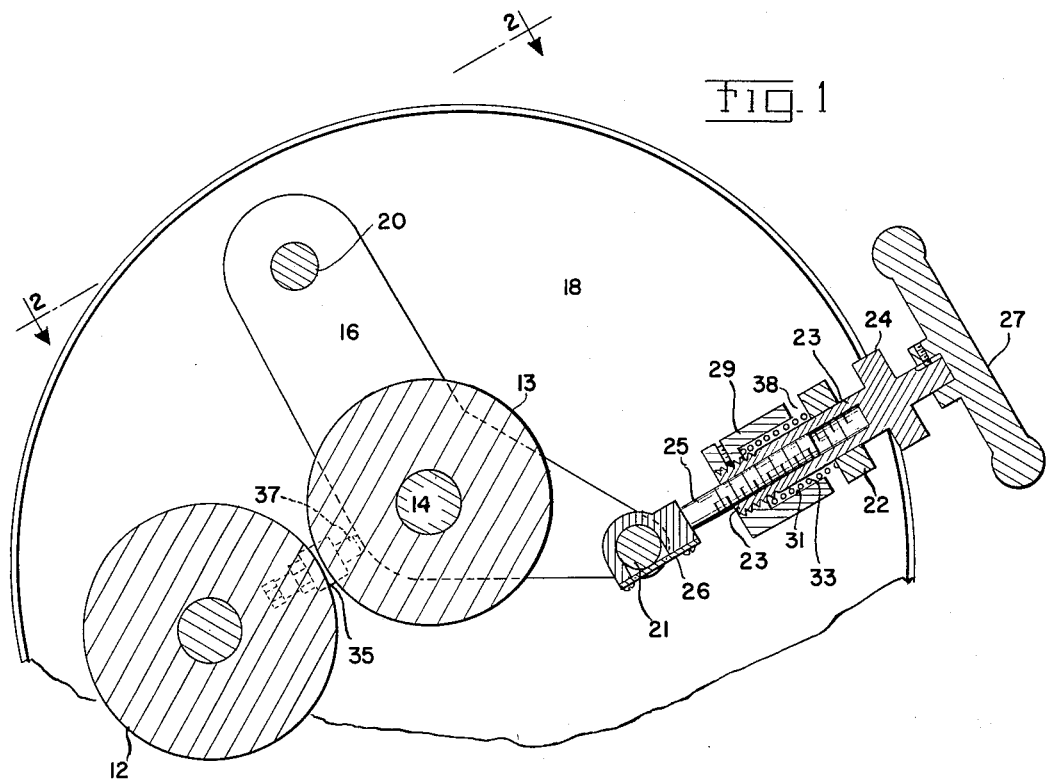
Figure 1 is a sectional elevation, taken on line 1—1 of Figure 2, showing a pair of pressing or sheeting rolls with one of the rolls adjustably mounted.
Figure 2:
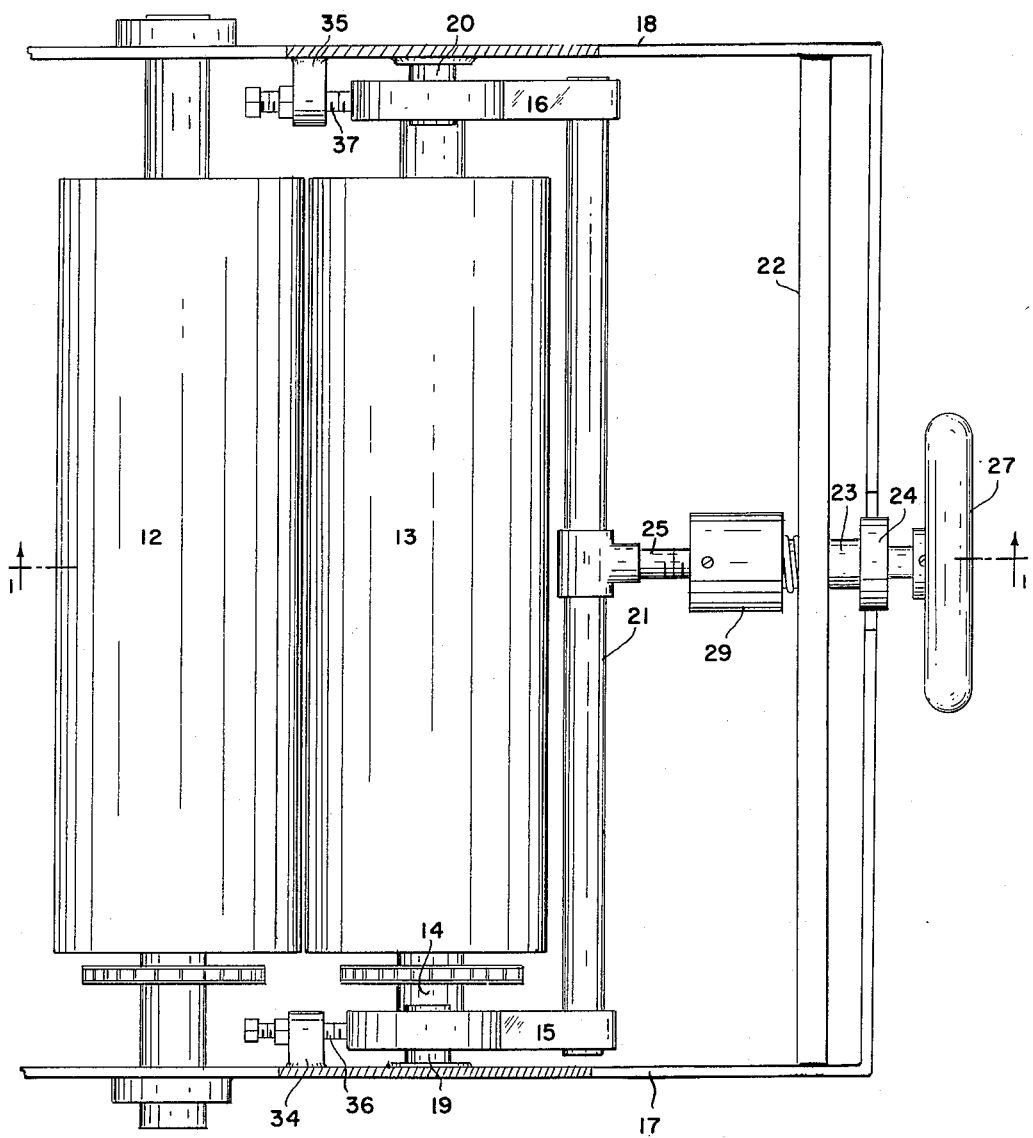
Figure 2 is a fragmentary plan view of the rolls of Figure 1, taken on line 2—2 of Figure 1, showing the mounting for the adjustable roll.

Referring now to Figures 1 and 2, the two dough sheeting or compressing rolls are indicated by the reference characters 12 and 13. These rolls are rotatably mounted and are assumed to be rotated towards each other at uniform speed, as is customary, by any suitable means (not shown). The axis of roll 12 is fixed. The axis of the companion roll 13 is adjustable in order that the spacing between the adjacent roll surfaces can be set to correspond to the desired thickness to be given the dough sheets. The particular means by which this adjustable roll 13 is positioned with respect to roll 12 and the means by which its relative change of axial position is controlled, constitute an important feature of this invention and will now be described.

The driven shaft 14 for the roll 13 is rotatably carried in a pair of swing frames 15 and 16 which are pivotally supported from stationary side plates 17 and 18, respectively, of the dough molding machine (not shown) by the pivot bolts 19 and 20, respectively. The swing frames 15 and 16 are connected together at their opposite ends by rod 21.

A bar 22, having its ends mounted in the side plates 17 and 18, is provided with a transversely-extending cylindrical channel to accommodate a sleeve 23 which is movably supported therein. The inside wall of this sleeve 23 is threaded and engages the threaded shank of a hook-shaped arm 25, which extends over the rod 21 and is held on the rod by a cross bar 26.

The outer end of the sleeve 23 has a shoulder 24 which limits the extent of axial movement of the sleeve in one direction within its channel in the supporting bar 22. A hand wheel 27 is secured on the outer end of the sleeve 23 by a suitable set screw.

The opposite or inner end of the sleeve 23 is threaded on its periphery and a collar 29 is adjustably mounted thereon and is secured in place by a suitable set screw. This collar is provided with an annular recess 31 in the end wall opposite the bar 22. A coil spring 33 is mounted in this recess 31 with one end of the spring bearing against the bar 22.

A pair of lugs 34 and 35 are secured to the side plates 17 and 18, respectively at equal distances from the pivot bolts 19 and 20 for the swing frames 15 and 16. Limit screws 36 and 37 are mounted in the lugs 34 and 35 respectively, and are arranged for engagement with the swing frames 15 and 16 in order to limit the adjusting movement of the swing frames 15 and 16 in clockwise direction (as viewed in Figure 1). Thus the limit screws 36 and 37 determine the minimum spacing between the rolls 12 and 13 and prevent the rolls from inadvertently being brought so close together that breaks in the dough sheets would result. The limit screws are preferably provided with suitable lock nuts to prevent any inadvertent turning of the limit screws after being set.

When the rolls 12 and 13 are operated for sheeting dough pieces the limit screws 36 and 37 are preferably set for only a very slight minimum clearance between the two rolls. With the swing frames 15 and 16 then resting against the limit screws 36 and 37 the sleeve 23 is adjusted by manipulation of the hand wheel 27 until the coil spring 33 is brought under desired compression and the spacing between the collar 29 and the bar 22 (thus, the space 38 in Figure 1), is made to correspond approximately to the maximum thickness desired for the dough sheets.

Since the axis of the roll 12 is in fixed position and the movable axis of the adjustable roll 13 is adjusted as indicated, with its position controlled by the means described, the dough pieces, upon being passed between the rotating sheeting rolls 12 and 13, will be compressed into flat sheets of uniform desired thickness. This thickness of the sheets will correspond approximately to the spacing 38 unless the spring 33 should be held under excessive compression. At the same time the tip ends of the sheets, even though these terminate in less thickness than the rest of the sheet, will nevertheless not escape the compressing action of the rolls. Consequently any excessive air bubbles or gas pockets which might otherwise succeed in surviving the passage of the dough between the sheeting rolls by reason of being located in the thinner ends of the dough sheets, will also be subjected to bursting compression due to the action of the spring 33 in causing the roll 13 to move closer to the roll 12. The resulting dough sheets will therefore have fewer air bubbles or gas pockets at their tip ends than dough which is sheeted by rolls mounted in the ways heretofore provided, and since such dough sheets will have fewer air bubbles or gas pockets they will produce bread loaves having substantially fewer undesirable large air spaces.

I claim:

A device of the character described for sheeting dough pieces and for reducing gas pockets therein, said device including a pair of dough sheeting rolls mounted on parallel shafts rotating in opposite directions at the same peripheral speed, the axial position of one of said shafts being fixed, a pivotally mounted frame supporting the other shaft and enabling the spacing between said rolls to be varied with the pivotal movement of said frame, adjustable stops limiting the movement of said frame towards said first mentioned shaft for the purpose of setting the minimum spacing between said rolls, a transverse member on said frame, an arm attached to said member, a sleeve adjustably threaded on said arm, a supporting bar, said sleeve slidably and rotatably supported in said bar, an adjustable collar on said sleeve located between said supporting bar and said transverse frame member, a recess in said collar, and a compression spring supported in said collar recess with its ends in engagement with the bottom of said recess and said supporting bar respectively, the engagement of said collar with said supporting bar defining the maximum spacing between said rolls, said spring having insufficient force to cause the thickness of the major portions of the dough sheets formed by said rolls to be less than said maximum spacing between said rolls, but nevertheless causing said rolls to exert pressure on the thinner tip ends of the dough pieces for reducing gas pockets therein to the extent permitted by said adjustable stops.

References Cited in the file of this patent

UNITED STATES PATENTS

| | | |
|---|---|---|
| 672,414 | Corby et al. | Apr. 16, 1901 |
| 2,563,224 | Dunkerly | Aug. 7, 1951 |
| 2,604,057 | Rhodes | July 22, 1952 |
| 2,605,723 | Rhodes | Aug. 5, 1952 |
| 2,669,948 | Naylor | Feb. 23, 1954 |